April 30, 1935.  J. J. MELLON  1,999,301
ELECTRICAL SYSTEM AND APPARATUS
Filed Sept. 29, 1933
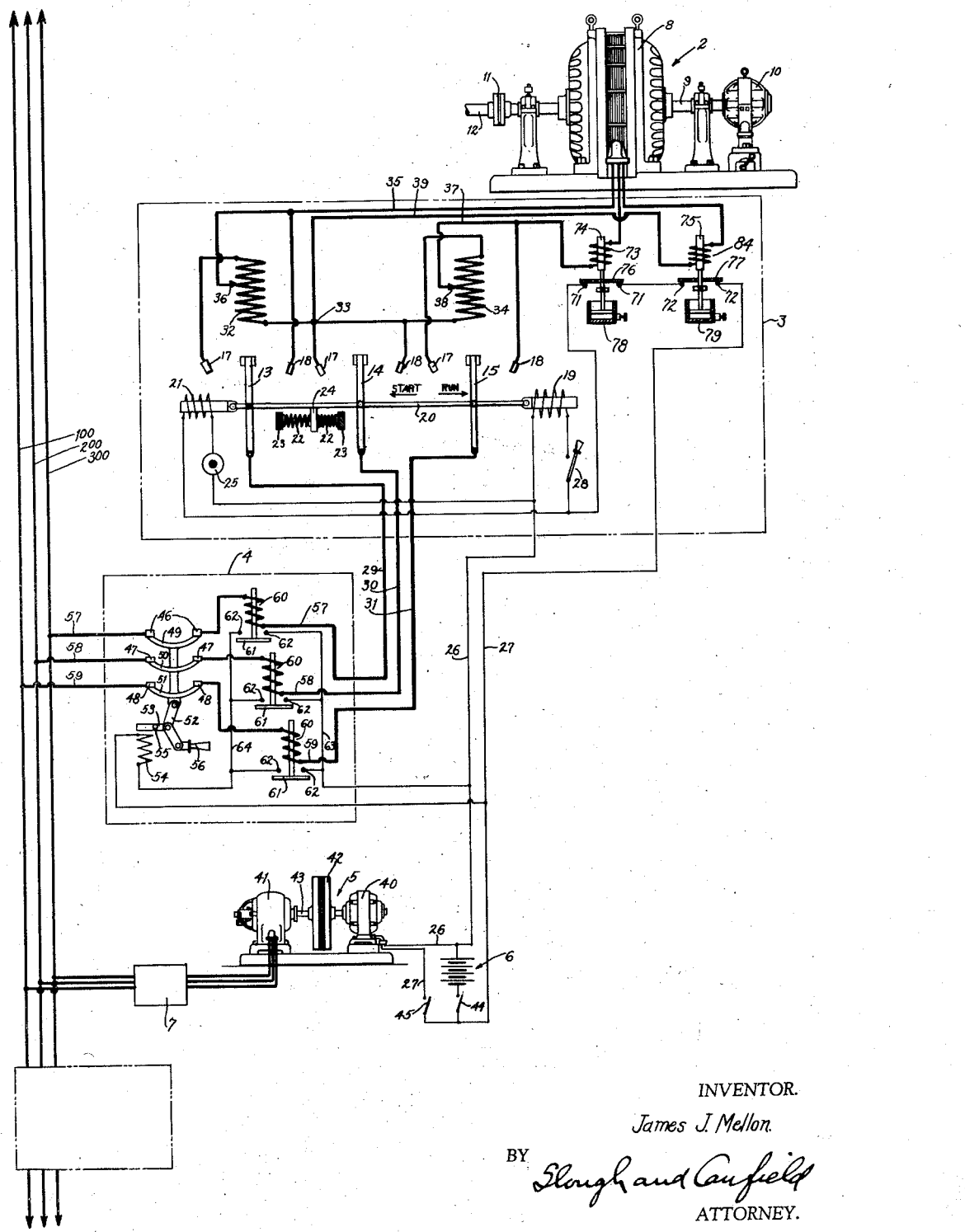
INVENTOR.
James J. Mellon.
BY
ATTORNEY.

UNITED STATES PATENT OFFICE 1,999,301

ELECTRICAL SYSTEM AND APPARATUS

James John Mellon, Cleveland, Ohio, assignor to The Clark Controller Company, Cleveland, Ohio, a corporation of Ohio Application September 29, 1933, Serial No. 691,497

7 Claims. (Cl. 172—179)

This invention relates to electrical systems and apparatus and particularly to electrical systems and apparatus for controlling the supply of electric power to various uses.

As will appear hereinafter, my invention may be variously applied but I have chosen to illustrate and describe it herein in connection with an electric motor and the electric system and apparatus for controlling the supply of energy thereto.

Electric energy, as supplied to electric motors, particularly motors of large horse power, is controlled by electric switches, controllers or the like, to start, stop and reverse the motor, or change its speed etc. Protective apparatus is in many cases also provided in the electric power system whereby upon the occurence of a current overload in the system, such for example as an accidental ground or short circuit, the circuit to the motor may be broken or interrupted.

Where high voltages are employed, there have been developed protective circuit breakers for this purpose distinctive in character from the circuit controlling switches or controllers which control the supply to the motor. The motor controller or controlling switching apparatus has been developed to withstand the strains and wear of frequent use because of the necessity of frequently starting and stopping and otherwise controlling the motor. In such controlling apparatus, the switch contacts which may make or break or modify the motor circuit have been designed to handle relatively small current and to introduce relatively small gaps or breaks in the supply circuit, this being sufficient for motor controlling purposes. The circuit breakers, however, must be designed to carry and to break enormous current at the high voltages employed and must be adapted to open their contacts with great velocity of their moving parts; and such construction necessary as a circuit breaker renders them impractical for use as motor circuit controllers.

As is well known in this art, a motor controller of the kind referred to herein may operate successfully over a long period of time to control the current to the motor during normal operations, and to open the motor circuit upon the occurrence of small working overloads, but would be unable to interrupt or open the motor circuit upon the occurrence of a great overload and, in fact, might be destroyed if its contacts were opened during such overload. Thus it is generally the practice to employ a circuit breaker such as one having its contacts held closed mechanically, and designed especially for the purposes above indicated, in connection with a motor controller, the first to break the circuit only upon the occurrence of great overload and the other to control the motor circuits during normal operation.

It will therefore be clear that it is desirable to provide some protective function in the system to insure that upon the occurrence of an overload of magnitude beyond the ability of the controller to interrupt, the circuit will be opened or broken on the circuit breaker and not on the controller.

It is the general practice, particularly in the case of large motors, to provide a controller the contacts of which are operated by electromagnets, supplied with current from the power mains which also supply power to the motor. Now a great overload of current is usually accompanied by a corresponding reduction of voltage on the system; and where the controller electro-magnetic windings are economically designed, such reduction of voltage may in many cases reduce the energization of the controller electro-magnetic windings to the point where the controller contacts will open up. Thus there is danger that the controller contacts will open upon the occurrence of a great overload before the operation of the circuit breaker, resulting in destruction of the controller by the enormous heat and dissipation of power concentrated in the relatively low current carrying capacity contacts of the controller.

It is therefore an object of my invention to provide, in a system of the class referred to, improved means for insuring that contacts of the normal operation controller will remain closed upon the occurrence of an overload in the system until after the operation of the emergency circuit breaker, notwithstanding the concurrent occurrence of a reduction of voltage in the circuit energizing the electromagnetic windings of the controller.

Another object is to provide, in a system and apparatus of the class referred to, improved means for energizing the electromagnetic windings of the normal operation controller.

Another object is to provide, in a system of the class referred to comprising a normal operation controller and an emergency circuit breaker, improved means for energizing the electro-magnetic windings of the controller from the power mains of the system through an auxiliary means having energy storage capacity for maintaining voltage upon the controller electromagnetic windings above a predetermined minimum upon a drop of supply voltage occasioned by an overload in the system.

Another object is to provide, in a system of the class referred to comprising a normal operation controller and an emergency circuit breaker, means for temporarily energizing the electromagnetic windings of the controller upon the occurrence of a current overload and consequent voltage drop in the supply mains to insure that the controller contacts will remain closed until the opening of the circuit breaker contacts.

Other objects will be apparent to those skilled in the art to which my invention appertains.

My invention is fully disclosed in the following description taken in connection with the accompanying drawing, in which:

The single figure is a diagrammatic representation of an electric system and apparatus whereby my invention may be practiced.

Referring to the drawing, I have shown at 100, 200 and 300, current supply mains, and at 2 an electric motor to be supplied with current therefrom; and inasmuch as my invention has particular advantages when applied to an alternating current system, I have illustrated the mains 100, 200 and 300 as alternating current supply mains, and the motor 2 as a synchronous motor.

At 3 is indicated generally and diagrammatically, an automatic electromagnetically operated controller for the motor 2. A controller 3 may be provided to variously control the motor such as to effect starting, stopping, dynamic breaking, reversing, etc., but for the sake of simplicity I have illustrated a controller 3 to perform merely the functions of starting and stopping, and of opening the motor circuit upon the occurrence of the usual operating overloads.

At 4 I have illustrated in general and diagrammatically an automatic circuit breaker to open the circuit from the supply mains 100, 200 and 300 to the motor 2 upon the occurrence of a great overload in the circuit.

At 5 I have illustrated generally a converting apparatus of the rotary type for converting alternating current of the supply mains 100, 200 and 300 into direct current; and at 6 I have shown a storage battery in association with the rotary converter 5. At 7 is indicated a controller for the motor portion of the rotary converter 5 to start and stop the same.

The synchronous motor 2 may be of the usual or any suitable construction comprising a stator 8 and a rotor therewithin not shown but mounted upon a shaft 9. An exciter 10 is provided to supply direct current energization for the field of the motor, the exciter being driven by the shaft 9. The shaft may be coupled as at 11 to a power supplying shaft 12 which may be connected to mill rolls or other apparatus to be driven in a well known manner.

The controller 3 may be of any known or suitable construction, and in the form illustrated diagrammatically, comprises pivotally mounted switch arms 13, 14 and 15 carrying contacts on their free ends and movable from the intermediate open circuit or neutral position illustrated, toward the left to engage starting contacts 17 or toward the right to engage running contacts 18. An electromagnet having a winding 19 is adapted to move a connecting bar 20 toward the right to effect engagement of the contacts 18 and an electromagnet having a winding 21 is correspondingly provided to move the connector 20 toward the left to effect engagement of the contacts 17. A pair of compression springs 22—22 is provided reacting upon stationary abutments 23—23 and upon an arm 24 on the connector 20, whereby on de-energization of the windings 19 and 21, the switch arms 13 will be returned to their neutral or off position.

A push button 25 and a switch 28 are provided to respectively and optionally energize the windings 21 and 19 from supply mains 26 and 27 to effect, respectively, closing of the starting contacts 17 or the running contacts 18. The windings 19 and 21 are under the control of the contacts 71—71 and 72—72 of two overload relays energized by two of the three motor mains.

In the operation of the controller 3, current may flow from the mains 100, 200 and 300, through the circuit breaker 4 to be described, and by way of mains 29, 30 and 31 to the switch arms 13, 14 and 15. Upon closing the starting push button 25, the switch arms will be moved from their "off" position illustrated to engage the contacts 17 whereupon current from the main 29 may flow through the switch arm 13, one of the starting contacts 17, through the winding 32 of a transformer, to junction point 33. Current may likewise flow from the supply main 31 to the switch arm 15 and its starting contact 17 through the transformer winding 34 to the point 33; and current may flow directly from the main 30 to the switch arm 14 and its starting contact 17 to the point 33.

One of the motor supply mains, 35, is connected to an adjustable point 36 on the transformer winding 32; another of the motor mains 37 is connected to a similar point 38 on the transformer winding 34; and the third motor main 39 is connected to the point 33.

By these connections, which will be recognized by those skilled in the art as the connections of a transformer starter or inductor starter for the motor, current from the mains 29, 30, 31 will be supplied to the mains 35, 39 and 37 at reduced or starting voltage. The motor 2 may thus be started (preferably without energization of its direct current field), and after it has attained a suitable speed, the push button 25 may be released allowing it to open, thereby de-energizing the winding 21, and the switch 28 may then be closed to energize the winding 19, whereupon the switch arms will be moved over to engage the running contacts 18. Current may now flow directly from the mains 29, 30 and 31 to the mains 35, 39 and 37 through the said switch arms and running contacts and the motor 2 will be supplied with the line voltage and its field may be energized to effect the well known synchronous operation of the motor 2.

Upon subsequently opening the switch 28, the winding 19 will be de-energized and the springs 22—22 will move the switch arms 13, 14 and 15 to their off position, permitting the motor to stop.

The motor main 35 goes directly to the motor 2; the mains 37 and 39 go first through windings 73 and 84 of overload relays. Upon the occurrence of a predetermined overload in the motor mains one or the other of the relay windings 73 or 84 (or both) will be energized sufficiently to lift its corresponding plunger 74 or 75 to lift its switch bar 76 or 77 to break the control circuit of the supply main 27 at the contacts 71—71 or 72—72; thus de-energizing the winding 21 or 19 and effecting opening of the motor circuit the same as if push button 25 or switch 28 were opened. A time interval is introduced between the occurrence of the overload and the opening of the control circuit on the contacts 71 and 72 for a purpose to be described. Any suitable delay means may be provided for these relays, such for example as the well known dash pot devices illustrated diagrammatically at 78—79.

In the preferred practice of my invention, the windings 21 and 19 are energized with direct current. As is well known in the art, this practice is preferable where a suitable source of direct current is available because of the greater simplicity, cheapness and durability of direct current electromagnets as compared with alternating current magnets. The direct current for the mains 26 and 27 is supplied by the rotary converter 5 comprising a direct current generator unit 40 driven by an alternating current motor unit 41 supplied with alternating current from the mains 100, 200 and 300 through the controller 7, which controller may be of any known or suitable construction for the purpose. The motor generator is provided also with a relatively heavy fly wheel 42 preferably mounted on the common shaft 43 of the generator and motor 40—41.

As an auxiliary means of direct current supply, the storage battery 6 may be employed connected across the mains 26 and 27 through a switch 44. The battery 6 may "float" across the lines 26 and 27 and, if desired, a switch 45 in the line 27 may be opened to disconnect the generator 40 whereby the mains 26 and 27 will be supplied solely from the battery 6.

The circuit breaker, shown generally at 4, may be of any known or suitable construction and for that reason has been illustrated diagrammatically herein. It comprises three pairs of contacts 46—46, 47—47 and 48—48, adapted to be bridged by switch arms 49, 50 and 51 movable in unison and adapted to be held in contact-closed position by a toggle lever device 52 engaging, at the knee of the toggle, a movable stop 53. An electromagnetic trip winding 54 is disposed to rotate the stop 53 around a rotational bearing 55 to free the toggle 52 and allow the switch arms 49—51 to move downwardly by gravity to disengage the pairs of contacts.

Any suitable means may be provided to close the contacts, such for example as the hand-operable lever 56 by which the toggle device 52 may be operated to set it; and when in the contact-closed or set position, the stop 53 may be replaced to hold the contacts closed.

Lines 57, 58 and 59 connect the mains 100, 200 and 300 to the mains 29, 30 and 31, through the switch arms 49—51, and in each line 57, 58 and 59 is the winding 60 of a series overload relay device comprising each a movable contact 61 and a pair of contacts 62—62.

Current may flow from the direct current main 26 to a line 63 and thence through the contacts 62 and switch arm 61 of the overload relays, in parallel relation, to a line 64, and thence through the winding 54 and back to the supply main 27.

In the operation of the system thus described, the motor generator 41—40 is first started by the controller 7 and the mains 26—27 energized with direct voltage, the motor 41 attaining a predetermined speed to effect the generation of a predetermined voltage in the mains. The circuit breaker 4 may then be set to closed position which will communicate the voltage of the lines 100, 200 and 300 to the lines 29, 30 and 31. The controller 3 may then be operated, as above described, to start the motor 2 and the load may be put on the motor shaft 12.

At any time the motor may be stopped and again started, or other functions performed by the controller 3. If, however, due to any accident or abnormality, a great overload of current should flow to the motor through the mains 57, 58 and 59, or through any one of them, one or another of the relay windings 60 will be energized sufficiently to close the contacts 62—62 thereof. This operating overload value may be predetermined in a well known manner by providing the overload relays with suitable adjustment means not shown. Current may then flow from the direct current mains 26 and 27 through the relay contacts to the winding 54, thereby operating the stop 53 to release the toggle 52 and permit the switch arms 49—51 to open their contacts, shutting off the supply of current to the motor 2.

Upon the occurrence of a large overload, and before the circuit breaker 4 has had time to open the circuit, the voltage upon the mains 100, 200 and 300 as well as upon the mains 29, 30 and 31, will be reduced for well known reasons. If, therefore, the magnet windings 19 and 21 of the controller 3 were energized from these mains, the energization thereof would be reduced and the contacts of the controller 3 might open and with apparatus of commercial standard design very probably would open, before the circuit breaker opened. In the case of a large overload, this might and probably would destroy or render thereafter inoperative the controller 3. With the arrangement shown and described above, however, this cannot occur. Upon the occurrence of the overload and the consequent fall of voltage, there may be a tendency for the motor 41 of the motor generator set to fall in speed but this will be counteracted by the inertia of the fly wheel 42 which will maintain the former speed of the motor 41 substantially constant for a substantial period of time; and thus, although the voltage on the mains 100, 200 and 300 or the mains 29, 30 and 31 may fall, the direct current voltage of the mains 26 and 27 will be substantially maintained constant during this period. Thus the windings 19 and 21 will be substantially fully energized, holding the contacts of the controller closed. During this interval, the circuit breaker 4 will have plenty of time to open its contacts and rupture the overload current. Then, subsequently as the energy of the fly wheel 42 is dissipated, and if in the meantime the operator has not opened the switch 28, the voltage in the mains 26 and 27 may fall to the point where the controller contacts will open up, but since they are at this time carrying no current at all, no damage will result.

Upon the occurrence of an overload sufficient to operate the overload relays of the circuit breaker 4, the overload relays of the controller 3 above described will, of course, operate, the latter being set always for a lower overload than the former. But the time interval or delayed action of the overload relays of the controller 3 will delay their action beyond the short time for the circuit breaker to operate. Thus, on the occurrence of small overloads the controller overload relays will cause the controller to break the circuit, but the large overloads will be broken on the circuit breaker.

It will now be apparent that it is not essential that the generator 40 generate direct current. Many of the advantages of the invention may be enjoyed if it be an alternator and if the controller 3 be provided with alternating current windings, although, as is apparent, if a separate generator 40 is to be provided, it may as well be a direct current generator in order that the advantages of direct current at the controller 3 may be enjoyed. Incidentally, where direct current is used, the battery 6 may be provided; and then in the case of an overload and reduction of voltage, the voltage on the mains 26 and 27 may be maintained indefinitely without any drop thereof, and current therein supplied from the battery 6. The switch 45 in this connection may be provided to prevent the current from the battery from discharging back through the generator 4 as the latter slows down more and more.

Thus, the storage capacity referred to hereinbefore which may be drawn upon to energize the windings of the controller 3, may be considered either as the mechanical storage in the fly wheel 42 and associated parts or electrical storage in the battery 6.

Again, it will be apparent that, although I have illustrated an alternating current motor 2 supplied from alternating current mains 100, 200 and 300, the advantages of my invention may be practiced with a direct current motor at 2 supplied by direct current mains. In other words, the entire system may be a direct current system; but inasmuch as the high destructive voltages encountered are usually of alternating current, my invention probably has its most important application in the alternating current field.

The practice of my invention is not limited to the exact details of construction and circuit connection shown and described. Many changes and modifications may be made therein without departing from the scope and spirit of my invention or sacrificing its advantages.

I claim:

1. In an electric system and apparatus, a source of electric current at a predetermined source voltage, an electric motor, an electric circuit for supplying current to the motor from the source, a first controller means electrically operably energizable from predetermined supply voltage for controlling the motor circuit, a second controller means comprising electro-responsive means responsive to an over-load condition of the motor circuit and comprising a time interval producing means and adapted to interrupt energization of the first controller means after a predetermined duration of a predetermined degree of over-load in the motor circuit, an electrically energizable circuit breaker means for the motor circuit having means responsive to the predetermined supply voltage and jointly responsive thereto and to a predetermined over-load condition of the circuit, and means deriving energy from the source and having energy storage capacity for energizing the first controller means, subordinate to the second controller means, and for energizing the circuit breaker means substantially at the predetermined supply voltage independently of variations of the source voltage effected by the over-load in the motor circuit.

2. In an electric system and apparatus, a source of electric current at a predetermined source voltage, an electric motor, an electric circuit for supplying current to the motor from the source, a first controller means electrically operably energizable from predetermined supply voltage for controlling the motor circuit, a second controller means comprising electro-responsive means responsive to an over-load condition of the motor circuit and comprising a time interval producing means and adapted to interrupt energization of the first controller means after a predetermined duration of a predetermined degree of overload in the motor circuit, an electrically energizable circuit breaker means for the motor circuit having means responsive to the predetermined supply voltage and jointly responsive thereto and to a predetermined over-load condition of the circuit, and a motor generator driven from the source and having mechanical energy storage capacity for energizing the first controller means, subordinate to the second controller means, and for energizing the circuit breaker means substantially at the predetermined supply voltage independently of variations of the source voltage effected by the over-load in the motor circuit.

3. In an electric system and apparatus, a source of electric current at a source voltage, an electric motor, an electric circuit for supplying current to the motor from the source, controller means comprising electrically energizable means responsive normally to close the motor circuit, and responsive abnormally to a predetermined reduction of the supply voltage below a predetermined minimum value to open its contacts, a circuit breaker for the circuit having electrically energizable means operative responsive to break the circuit under the joint action of an overload current condition of the circuit and of voltage above a predetermined minimum only, a motor generator set driven from the source and having energy storage capacity for supplying energy to both said electrically energizable means at voltage above both said predetermined minimum values independently of variations of the source voltage effected by said electric conditions to prevent abnormal operation of the first controller means and to insure response of the circuit breaker to break the circuit upon a reduction of voltage effected by said overload condition.

4. In an electric system and apparatus, a source of electric current at a predetermined source voltage, an electric motor, an electric circuit for supplying current to the motor from the source, a first controller means electrically operably energizable at voltage above a predetermined minimum voltage only for controlling the motor circuit, a second controller means comprising electro-responsive means responsive to an overload condition of the motor circuit and comprising a time interval producing means and adapted to interrupt energization of the first controller means after a predetermined duration of a predetermined degree of overload in the motor circuit, an electrically energizable circuit breaker means for the motor circuit having means responsive to voltage above a predetermined minimum only and jointly responsive thereto and to a predetermined overload condition of the circuit, and means deriving energy from the source and having energy storage capacity for energizing the first controller means, subordinate to the second controller means, and for energizing the circuit breaker at voltage substantially above both said minimum voltages independently of variations of the source voltage effected by the overload in the motor circuit.

5. In an electric system and apparatus, a source of electric current at a predetermined source voltage, an electric motor, an electric circuit for supplying current to the motor from the source, a first controller means electrically operably energizable at voltage above a predetermined minimum only for controlling the motor circuit, a second controller means comprising electro-responsive means responsive to an overload condition of the motor circuit and comprising a time interval producing means and adapted to interrupt energization of the first controller means after a predetermined duration of a predetermined degree of overload in the motor circuit, an electrically energizable circuit breaker means for the motor circuit having means responsive to voltage above a predetermined minimum only and jointly responsive thereto and to a predetermined overload condition of the circuit, and a motor generator driven from the source and having mechanical energy storage capacity for energizing the first controller means, subordinate to the second controller means, and for energizing the circuit breaker means at voltage substantially above both said minimum voltages independently of variations of the source voltage effected by the overload in the motor circuit.

6. In an electric system and apparatus, a source of electric current supply at a predetermined source voltage, an electric motor, an electric circuit for supplying current to the motor from the source, an electrically energizable controller means operatively responsive to voltage above a predetermined minimum value only for controlling the motor circuit, an electrically energizable circuit breaker means for the circuit operatively responsive to break the circuit under the joint action of an overload condition of the circuit and voltage above a predetermined minimum value only, auxiliary current supplying means deriving energy from the source and having energy storage capacity for energizing the controller means and the circuit breaker means at voltage substantially above both said predetermined minimum voltages independently of variations of the supply voltage effected by said overload in the motor circuit.

7. In an electric system and apparatus a source of electric current supply at a predetermined source voltage, an electric motor, an electric circuit for supplying current to the motor from the source, a first controller means electrically responsive to voltage above a predetermined minimum value only for controlling the motor circuit, circuit breaker means for the motor circuit electrically operatively responsive to break the circuit under the joint action of an overload condition of the circuit and of voltage above a predetermined value only, a motor generator device driven by energy from the source and having mechanical energy storage means for driving it to energize both the controller means and circuit breaker means at voltage substantially above both said predetermined minimum voltages independently of variations of the source voltage effected by the overload condition of the circuit.

JAMES JOHN MELLON.